United States Patent
Guvenc

(10) Patent No.: US 8,901,954 B2
(45) Date of Patent: Dec. 2, 2014

(54) ACTIVE SHIELD WITH ELECTRICALLY CONFIGURABLE INTERCONNECTIONS

(71) Applicant: Tubitak, Ankara (TR)

(72) Inventor: Umut Guvenc, Kocaeli (TR)

(73) Assignee: TUBITAK, Ankara (TR)

( * ) Notice: Subject to any disclaimer, the term of this patent is extended or adjusted under 35 U.S.C. 154(b) by 0 days.

(21) Appl. No.: 14/238,736

(22) PCT Filed: Nov. 16, 2012

(86) PCT No.: PCT/IB2012/056509
§ 371 (c)(1),
(2), (4) Date: Feb. 13, 2014

(87) PCT Pub. No.: WO2013/072897
PCT Pub. Date: May 23, 2013

(65) Prior Publication Data
US 2014/0191781 A1    Jul. 10, 2014

(30) Foreign Application Priority Data
Nov. 18, 2011   (TR) .................................. 2011 11432

(51) Int. Cl.
*G06F 21/60* (2013.01)
*H01L 23/00* (2006.01)

(52) U.S. Cl.
CPC .............. *G06F 21/60* (2013.01); *H01L 23/576* (2013.01)
USPC ...................................... 326/8; 326/21; 326/1

(58) Field of Classification Search
None
See application file for complete search history.

(56) References Cited

U.S. PATENT DOCUMENTS

| | | | |
|---|---|---|---|
| 6,496,119 B1 | 12/2002 | Otterstedt et al. | |
| 6,798,234 B2 * | 9/2004 | Laackmann et al. | 326/21 |
| 7,042,752 B2 * | 5/2006 | Okuda | 365/112 |
| 7,352,203 B1 * | 4/2008 | Ziomek | 326/8 |
| 7,535,744 B2 * | 5/2009 | Okuda | 365/112 |
| 7,622,944 B2 * | 11/2009 | Ziomek | 326/8 |
| 7,982,488 B2 * | 7/2011 | Nirschl et al. | 326/8 |
| 2003/0132777 A1 * | 7/2003 | Laackmann et al. | 326/1 |
| 2007/0189055 A1 * | 8/2007 | Okuda | 365/114 |
| 2008/0031031 A1 * | 2/2008 | Okuda | 365/112 |
| 2008/0150574 A1 * | 6/2008 | Ziomek | 326/8 |
| 2010/0301896 A1 * | 12/2010 | Nirschl et al. | 326/8 |

FOREIGN PATENT DOCUMENTS

| | | |
|---|---|---|
| EP | 0268882 | 6/1988 |
| EP | 1538666 | 6/2005 |

* cited by examiner

*Primary Examiner* — Crystal L Hammond
(74) *Attorney, Agent, or Firm* — Gokalp Bayramoglu

(57) ABSTRACT

Introduced is an active shield method providing security to a security critical integrated circuit against some physical attacks like probing, manipulation and modification, while providing the ability to detect any physical modification made on the active shield itself. Electrically controllable switching circuits are used to construct the upper layer conductive bit lines with electrically selectable different interconnection configurations. These bit lines arranged in a shielding pattern are used to carry a test data between a transmitter circuitry and a number of receiver circuitries which verify the integrity of the shielding lines to provide the security for the integrated circuit. By changing the selected interconnection configuration of the bit lines with a select signal produced by the transmitter, the self detection ability of the proposed active shield is provided as a countermeasure against the vulnerability to physical modification made on the active shield itself.

1 Claim, 3 Drawing Sheets

ACTIVE SHIELD WITH ELECTRICALLY CONFIGURABLE INTERCONNECTIONS

TECHNICAL FIELD

Figure 1:
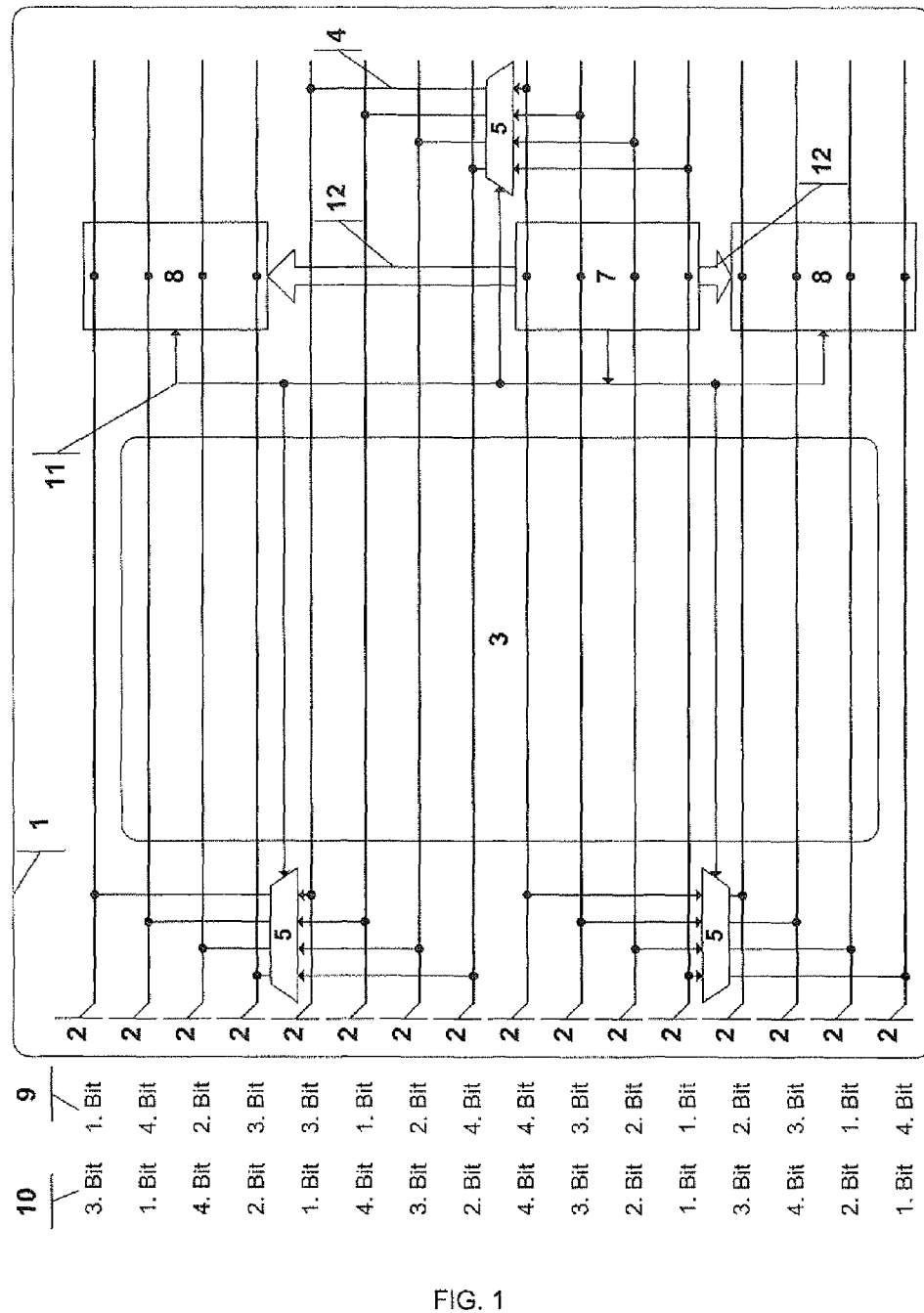

The invention is related to integrated circuits including security critical circuit components and integrated circuits processing or storing secret information.

BACKGROUND ART

In security critical integrated circuits, some security countermeasures are implemented to provide safety of the critical information against some analysis and attack techniques aimed to obtain the information in an unauthorized way. Active shield is a countermeasure providing security against some attacks depending on physically monitoring or manipulating the integrated circuit from outside. These attack techniques include probing the critical information by making connections to the metal lines of the integrated circuit, faulting the integrated circuit by forcing from these outside connections and changing the connections of the internal metal lines permanently by using FIB (Focused Ion Beam).

In active shield method, the whole surface of the integrated circuit is covered by metal lines on the top metal layer. A transmitter circuitry which supplies a test data to the metal lines covering the whole chip and a number of receiver circuitries which compare the test data received from the top layer metal lines with the original test data received from the transmitter internally are added to integrated circuit. According to the result of the comparison, these receiver circuitries verify the integrity of the top layer metal lines. Since any physical attack will disturb the integrity of the top layer metal lines by making them open or short circuit, the receiver circuitries do not receive the correct test data pattern from the top layer metal lines, thus detect the physical attack.

It is believed that the references; US 2009/0024890 A1, US 2008/0244749 A1, US 2008/0150574 A1, US 2005/0092848 A1 and US 2003/0132777 A1 provide sufficient information on the background of the active shield method. In reference document US 2005/0092848 A1, a way of implementing the active shield method without requiring an additional metal layer is introduced and in reference documents US 2009/0024890 A1 and US 2008/0150574 A1, improvements are aimed to reduce the power consumption due to active shield. The reference US 2008/0244749 A1 introduces some improvements mainly on the detection circuitry part of the active shield method, not on the protection of the top metal layer shield itself.

Technical Problem

Although being used in integrated circuits to detect any physical attack, active shield itself has still vulnerability against physical modification. Since the top layer metal lines of the active shield have fixed interconnections, it is possible to make shortcut connections between the lines and remove the parts covering the whole integrated circuit or a part of it, to perform the actual attack without being detected by the active shield. Some improvements can be made to decrease the vulnerability of the active shield to physical modification, like randomization of the connections of the top layer metal lines and increasing the number of receiver circuitries, however it is not possible to prevent the vulnerability completely.

In reference document US 2003/013277 A1, a novel countermeasure against physical modification on the active shield is introduced. A capacitive measurement between the top layer metal lines of the active shield is performed along with the verification of the test data, to check whether the top layer metal lines are integral in their actual shapes. However, since the mentioned capacitive measurement between the top layer metal lines cannot be performed precisely, it is still possible for an attacker to perform partial physical modifications on the active shield while still satisfying sufficient capacitive coupling between the top layer metal lines.

Technical Solution

It is aimed to prevent the vulnerability caused by the fixed interconnections of the top layer metal lines by introducing a method using electrically configurable interconnections. Using electrically configurable interconnections provides the opportunity to select from more than one interconnection scheme during the operation of the integrated circuit. This dynamic configurability of the invention introduces a precise self integrity checking mechanism to the active shield method. Thus, it is prevented to bypass and remove the metal lines of the active shield by making fixed shortcut connections between them.

BEST MODE FOR CARRYING OUT THE INVENTION

Figure 3:
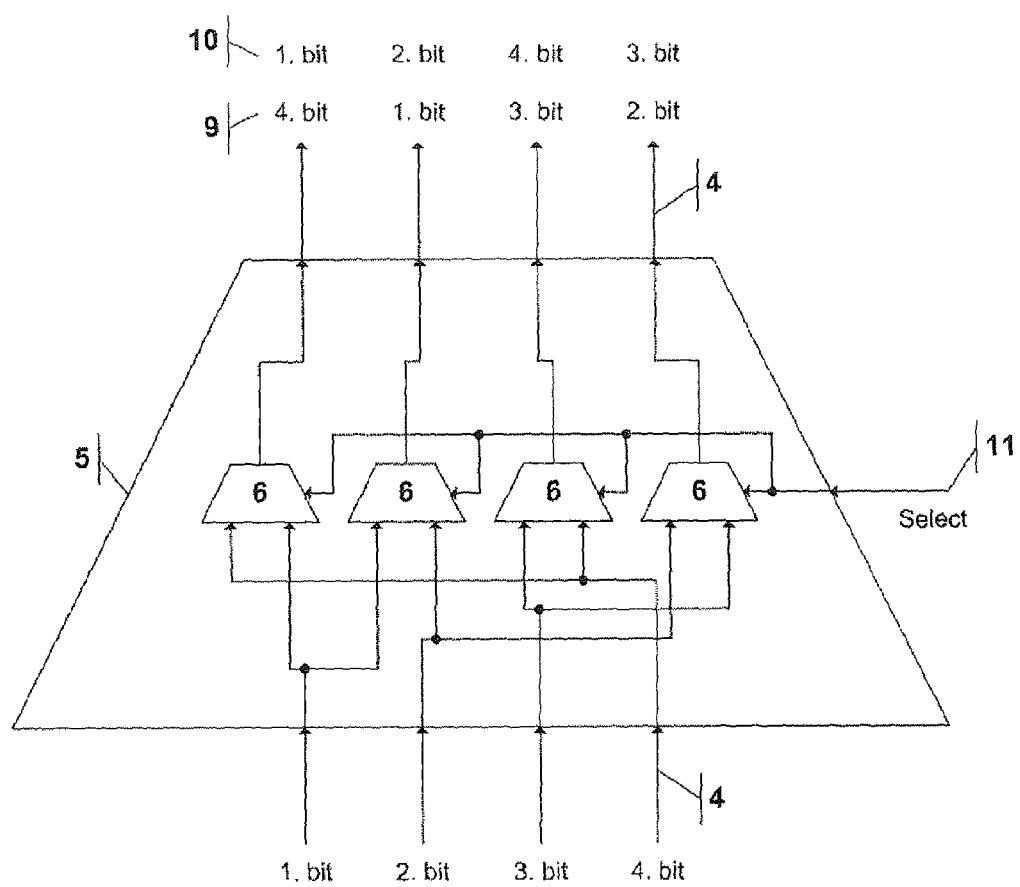

An integrated circuit (1) having an active shield according to the invention is illustrated in FIG. 1. A multiplicity of upper layer conductive lines (2), generally realized on top metal layer of the preferred technology, covers the whole surface of the integrated circuit (1) including the security critical circuit (3). The separate upper layer conductive lines (2) are connected by using lower layer conductive lines (4) and electrically controllable switching circuits (5), generally realized with multiplexers (6) as shown in FIG. 3, to construct the bit lines arranged in a shielding manner. These bit lines are used for the transmission of the test data between the transmitter (7) and the receivers (8). In FIG. 1, the number of separate bit lines is selected to be four and the number of receivers is selected to be two as an example. Using electrically controllable switching circuits (5) within the interconnections of the bit lines makes it possible to select from different random interconnection configurations (9 and 10) according to a select signal (11) produced by the transmitter (7). The number of random interconnection configurations (9 and 10) is selected to be two as an example.

The transmitter (7) transmits a test data, which is usually a random data, along with a select signal (11) used to determine which interconnection configuration (9 and 10) is selected by electrically controllable switching circuits (5). The receivers (8) receive the test data from the bit lines and reorder the bits of the data received according to the select signal (11) produced by the transmitter (7). The receivers (8) also receive the same test data from the transmitter (7) through internal data buses (12) arranged in lower layer conductive lines. Then, the receivers (8) compare the test data received from the bit lines with the actual test data received from the internal data buses (12), thus verify the integrity of upper layer conductive lines (2) of the active shield. Generally, the internal data buses (12) carrying the actual test data and the conductive lines carrying the select signal (11) from the transmitter (7) to the receivers (8), and the transmitter (7) and the receivers (8) themselves are arranged as a part of the integrated circuit (1) such as distributed within the whole layout and not easily recognizable for the sake of security. Thanks to the electrically controllable switching circuits used to construct different interconnection configurations (9 and 10), the active shield according to the invention, verifies the test data received from the bit lines with the actual test data for detection of the physical attacks focused on the integrated circuit (1), while providing the ability to detect any fixed modification made on the upper layer conductive lines (2) aimed to bypass the shielding pattern and remove at least a part of it. In order to satisfy the latter purpose, the transmitter (7) changes the selected interconnection configuration (9 and 10) during the operation of the integrated circuit (1) by changing the select signal (11) regularly or randomly. Thus, any fixed physical modification on the upper layer conductive lines (2) leads to an error in the verification of the test data.

Figure 2:
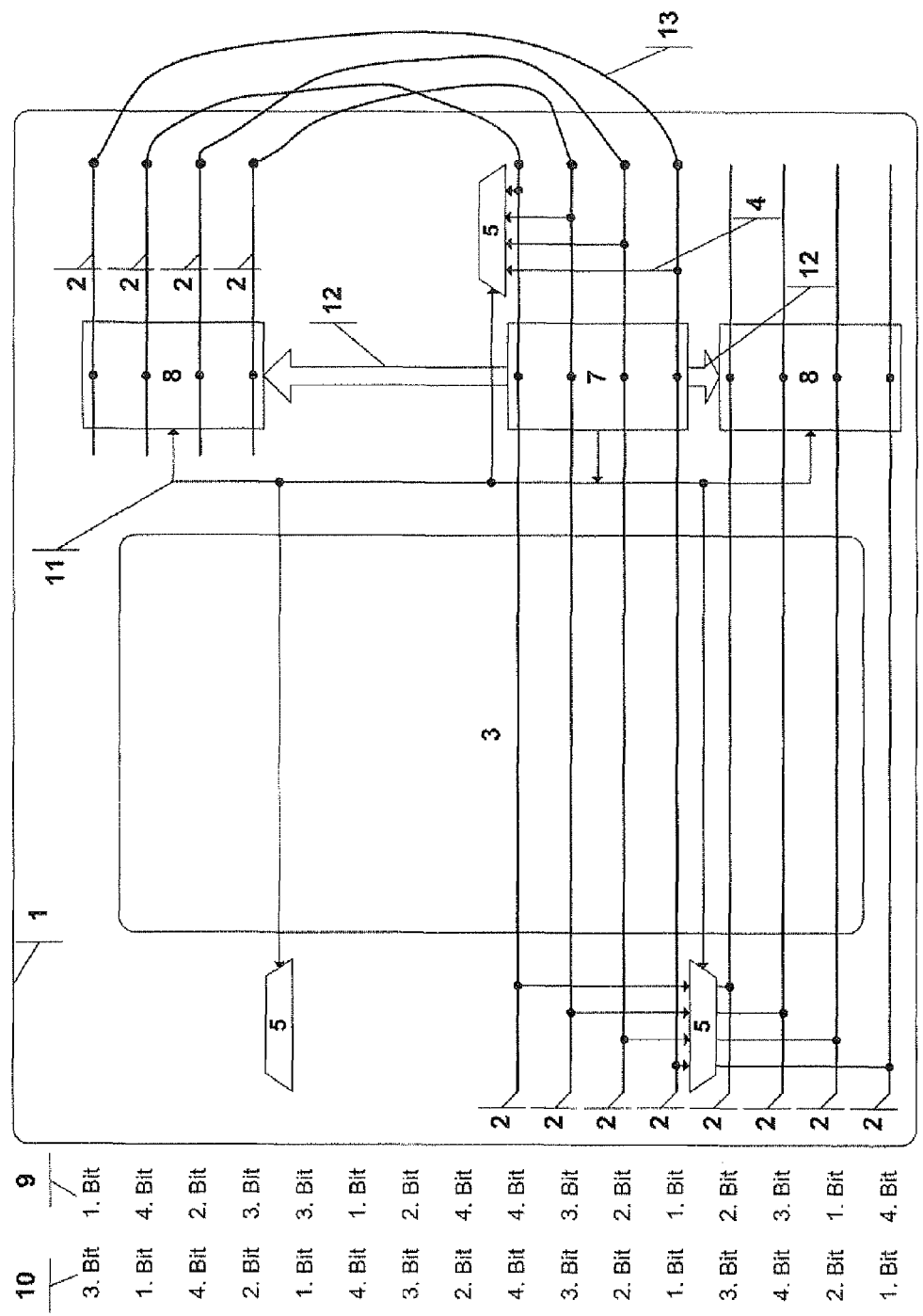

FIG. 2 illustrates an active shield according to the invention of which upper layer conductive lines (2) are partly removed from the top of the security critical circuit (3) by making fixed shortcut connections (13). These shortcut connections between the transmitter (7) and one of the receivers (8) are arranged to preserve the integrity of the bit lines according to the first interconnection configuration (9). Although the fixed shortcut connections (13) satisfy the correct transmission of the test data from the transmitter (7) to the receivers (8) when the first interconnection configuration (9) is selected, they do not satisfy the correct transmission of the test data when the second interconnection configuration (10) is selected. Since the transmitter (7) changes the select signal (11) regularly or randomly during the operation of the integrated circuit (1), the receivers (8) verify the integrity of the upper layer conductive lines (2) for all of the interconnection configurations (9 and 10), thus the vulnerability of the active shield to physical modification is prevented.

FIG. 3 shows an exemplary embodiment of the electrically controllable switching circuits (5). Four two-input multiplexers (6) are used to construct a part of the two different interconnection configurations (9 and 10) of four bit lines as an example. The select signal (11) determines in which order the inputs of the multiplexers (6) are connected to the outputs.

The invention claimed is:

1. An integrated circuit comprising an active shield, said active shield comprising
    upper layer conductive lines (2) arranged in a shielding manner to cover at least a part of a security critical circuit (3) arranged in lower layers of an integrated circuit (1); electrically controllable switching circuits arranged to select the connections of ones of said upper layer conductive lines (2) to other ones of said upper layer conductive lines (2) to form a multiplicity of data bit lines;
    internal data buses (12) arranged in lower layers of the integrated circuit (1);
    at least one transmitter (7) and a multiplicity of receivers (8), wherein the transmitter (7) is arranged to transmit test data to the receivers (8) via both the said data bit lines and said internal data buses (12),
    the said at least one transmitter (7) comprises means for generating a select signal (11) and means for transmitting the select signal (11) to the said receivers (8) and the said electrically controllable switching circuits (5) via a data path arranged in lower layers of the integrated circuit (1), and the said at least one transmitter (7) is arranged to change the value of the said select signal (11) in regular or random time intervals;
    the said electrically controllable switching circuits (5) are arranged to select different ones of said upper layer conductive lines (2) for the different values of the said select signal (11) to change the interconnection configuration (9,10) of the said bit lines;
    the said receivers (8) comprises means for reordering the said bit lines according to the said interconnection configuration (9,10) selected by the said select signal (11) and, the said receivers (8) are configured to compare the test data received from the said bit lines with the actual test data received from the said internal data buses (12), in order to verify the integrity of the said upper layer conductive lines (2).

* * * * *